UNITED STATES PATENT OFFICE 2,616,878

PROCESS FOR POLYMERIZING METHYL METHACRYLATE

Maurice Mention, Tapis Vert, Melle, Deux-Sevres, France, assignor to Les Usines de Melle (Societe Anonyme), Saint-Leger-les-Melle, France, a corporation of France No Drawing. Application November 22, 1949, Serial No. 128,910. In France December 1, 1948

3 Claims. (Cl. 260—89.5)

This invention relates to a process for polymerizing methyl methacrylate.

It is known that peroxides may be employed for the polymerization of methyl methacrylate. If benzoyl peroxide is used as a catalyst to polymerize methyl methacrylate, a sudden temperature rise occurs which results in monomeric methyl methacrylate evolving vaporous bubbles which remain as blobs in the polymerized substance at a time when the material is becoming viscous. Accordingly, the articles obtained are not limpid. Such bubble formation is a serious disadvantage in the manufacture of clear, limpid polymers. In addition, if benzoyl peroxide is used for polymerizing methyl methacrylate, polymers of varying consistency are obtained according to the amount of peroxide used. Thus, the polymers may range from pasty to solid according to such amount of peroxide.

The principal object of the present invention, accordingly, is to provide a simple and economical process for the polymerization of methyl methacrylate employing a peroxide catalyst which shall avoid at least in part some of the disadvantages mentioned in connection with the use of benzoyl peroxide.

The invention accordingly comprises the novel processes and steps of processes, specific embodiments of which are described hereinafter by way of example and in accordance with which I now prefer to practice the invention.

I have found in accordance with my invention that 2-methyltetrahydrofurane peroxide is capable of polymerizing methyl methacrylate to give a clear, limpid polymer free from bubbles or blobs. In addition, these polymers have a substantially uniform consistency; that is, they do not vary from pasty to solid but are uniformly solid products. 2-methyltetrahydrofurane peroxide may be prepared by stirring 2-methyltetrahydrofurane in the presence of air or other oxygen-containing gas. This operation may be carried out in the absence of a catalyst, but I preferably employ a cobalt salt such as cobalt acetate or a metallic salt of a metal in the same group as cobalt. On the other hand, the peroxide of methyltetrahydrofurane may be prepared by treatment of methyltetrahydrofurane with hydrogen peroxide. At the end of the oxidation operation, a solution of peroxide in methyltetrahydrofurane is obtained, the concentration of which is expressed in terms of oxygen volumes. It is preferable not to try to obtain a very high peroxide concentration, and the peroxidation is preferably stopped when the methyltetrahydrofurane contains 10 to 30 volumes of oxygen. This means that one volume of such peroxide solution, when treated with potassium iodide in an acid medium, makes free a quantity of iodine corresponding to 10 to 30 volumes of oxygen.

Generally, the methyltetrahydrofurane peroxide may, if desired, be used in a pure state, after having been separated from the non-oxidized methyltetrahydrofurane, for instance after the latter has been removed by evaporation. However, it has been found more convenient to use the solution of the peroxide in the mother-substance, either directly or after concentration, for example, by evaporation in the open air or under slightly reduced pressure. Furthermore, the use of such solution instead of pure peroxide is more advantageous in that the solution acts both less violently and more completely.

The following is an example illustrating a preferred embodiment of the process of the invention:

Example

To 50 grams of methyl methacrylate was added 0.15 gram of a solution of 2-methyltetrahydrofurane peroxide in methyltetrahydrofurane containing 20 volumes of oxygen. The mixture is boiled with reflux for 3 minutes and is then kept in a thermostat at 70° C. After 12 hours, a sudden temperature rise of the methacrylate is ascertained, the temperature reaching 80° C., then decreasing to 70° C.

After one further hour at 70° C., the product is found polymerized in the form of a perfectly limpid body.

For comparison, if 0.01 gram of benzoyl peroxide is added to the same quantity of methyl methacrylate as above and the mixture is then treated as above, after 5 hours, the temperature will rise to 95° C., and the polymer obtained contains blobs, presumably due to vaporization of a portion of the monomer having occurred at the time when the temperature rose.

As a catalyst, methyltetrahydrofurane peroxide is especially advantageous in promoting polymerization of methyl methacrylate as such since it causes a relatively little rise in temperature during the reaction. In addition, the polymerization occurs more slowly and the polymer so obtained is uniformly solid, limpid and free from blobs. It may thus be used in the manufacture of optical glasses and for other purposes requiring such uniform, bubble-free, clear polymers.

However, another advantage of using 2-methyltetrahydrofurane peroxide, or a solution thereof in 2-methyltetrahydrofurane, as a catalyst is that such peroxide or such solution may be used indifferently not only in the polymerization of methyl methacrylate as such, but also in the polymerization of methyl methacrylate dissolved in a suitable solvent or dispersed or emulsified in water. This is owing to the fact that methyltetrahydrofurane peroxide is soluble both in methyl methacrylate or solutions thereof in the solvents usually employed for carrying out the polymerization "in solution," and in water.

What I claim is:

1. A process for polymerizing methyl methacrylate which comprises, mixing methyl methacrylate with 2-methyltetrahydrofurane peroxide, and heating the mixture to effect polymerization.

2. A process for polymerizing methyl methacrylate which comprises, mixing methyl methacrylate with 2-methyltetrahydrofurane peroxide in the form of a solution of the latter in 2-methyltetrahydrofurane, and heating the mixture to effect polymerization.

3. A process for polymerizing methyl methacrylate which comprises, mixing methyl methacrylate with a solution of 2-methyltetrahydrofurane peroxide and 2-methyltetrahydrofurane, the amount of methyltetrahydrofurane peroxide in the solution being such that the solution is capable of liberating an amount of iodine corresponding to 10 to 30 volumes of oxygen when treated with potassium iodide in an acid medium, refluxing the mixture and maintaining it at a temperature of about 70° C. until a rise in temperature occurs, and then continuing the heating until a limpid polymer is obtained.

MAURICE MENTION.

REFERENCES CITED

The following references are of record in the file of this patent:

UNITED STATES PATENTS

| Number | Name | Date |
|---|---|---|
| 1,980,483 | Hill | Nov. 13, 1934 |
| 2,246,937 | Guinot | June 24, 1941 |